United States Patent
Tippur et al.

(10) Patent No.: US 10,718,607 B2
(45) Date of Patent: *Jul. 21, 2020

(54) DETERMINING GEOMETRIC CHARACTERISTICS OF REFLECTIVE SURFACES

(71) Applicant: Auburn University, Auburn, AL (US)

(72) Inventors: Hareesh V. Tippur, Auburn, AL (US); Chandru Periasamy, Beaverton, OR (US)

(73) Assignee: Auburn University, Auburn, AL (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/675,075

(22) Filed: Aug. 11, 2017

(65) Prior Publication Data
US 2017/0336197 A1  Nov. 23, 2017

Related U.S. Application Data

(62) Division of application No. 14/326,856, filed on Jul. 9, 2014, now Pat. No. 9,759,553.
(Continued)

(51) Int. Cl.
*G01B 11/30* (2006.01)
*G01B 11/24* (2006.01)

(52) U.S. Cl.
CPC .................... *G01B 11/24* (2013.01)

(58) Field of Classification Search
CPC ......... G01B 11/24; G01B 11/02; G01B 11/16; G01B 11/161; G01B 11/2408; G01B 11/2416; G01B 11/2441; G01B 11/245
(Continued)

(56) References Cited

U.S. PATENT DOCUMENTS

| 4,509,075 A | * | 4/1985 | Simms | G06T 5/50 250/223 B |
| 4,656,896 A | * | 4/1987 | Bietz | B23Q 17/24 33/655 |

(Continued)

FOREIGN PATENT DOCUMENTS

| CN | 201173895 Y | 12/2008 |
| WO | 19970274 66 A1 | 7/1997 |
| WO | 2007098935 A2 | 9/2007 |

OTHER PUBLICATIONS

Assa et al., "Recording slope and curvature contours of flexed plates using a grating shearing interferometer", Applied Optics, vol. 16, No. 9, Sep. 1997.
(Continued)

*Primary Examiner* — Sunghee Y Gray
(74) *Attorney, Agent, or Firm* — Barnes & Thornburg LLP (57) ABSTRACT

Illustrative embodiments of determining geometric characteristics of reflective surfaces are disclosed. In at least one illustrative embodiment, a method of determining geometric characteristics of reflective surfaces includes sensing electromagnetic waves with a sensor, where the electromagnetic waves have been reflected off a reflective surface of a specimen from a target structure including a feature point. The method further includes determining a displacement of the feature point of the target structure indicated by the sensed electromagnetic waves relative to reference data indicating a reference location for the feature point and determining a surface slope of a point of the reflective surface based on the determined displacement of the feature point of the target structure.

20 Claims, 10 Drawing Sheets

Related U.S. Application Data (60) Provisional application No. 61/844,157, filed on Jul. 9, 2013.

(58) Field of Classification Search
USPC .......................... 356/612, 614; 348/46, 744
See application file for complete search history.

(56) References Cited

U.S. PATENT DOCUMENTS

| | | | |
|---|---|---|---|
| 6,031,611 A * | 2/2000 | Rosakis | G01B 11/2441 356/511 |
| 7,057,472 B2 | 6/2006 | Marron | |
| 7,196,801 B1 | 3/2007 | Janik et al. | |
| 7,274,440 B1 | 9/2007 | Janik et al. | |
| 7,391,523 B1 | 6/2008 | Taylor, II et al. | |
| 7,433,056 B1 | 10/2008 | Janik | |
| 9,759,553 B2 | 9/2017 | Tippur et al. | |
| 2006/0158612 A1* | 7/2006 | Polland | A61B 3/107 351/206 |
| 2009/0171622 A1 | 7/2009 | Oue | |
| 2009/0244082 A1 | 10/2009 | Livingston | |
| 2010/0004773 A1 | 1/2010 | Kochergin | |
| 2010/0177164 A1* | 7/2010 | Zalevsky | G01B 11/162 348/46 |
| 2013/0076896 A1* | 3/2013 | Takabayashi | H04N 7/18 348/136 |
| 2013/0147919 A1* | 6/2013 | Xia | G01B 11/00 348/46 |
| 2015/0204662 A1* | 7/2015 | Kobayashi | G01B 11/2513 356/610 |
| 2015/0310663 A1* | 10/2015 | Yamasaki | H04N 9/31 348/136 |
| 2016/0247287 A1* | 8/2016 | Inaba | G06T 7/13 |

OTHER PUBLICATIONS

Koa, T.Y., et al., "Family of grating techniques of slope and curvature measurements for static and dynamic flexure of plates," Optical Engineering, vol. 21, No. 4, Jul./Aug. 1982.

Ritter. Reinhold, "Reflection moire methods for plate studies," Optical Engineering, vol. 21, No. 4, Jul./Aug. 1982.

Tippu R, Hareesh V., et al., "Optical mapping of crack tip deformations using the methods of transmission and reflection coherent gradient sensing: a study of crack tip K-dominance," International Journal of Fracture 52, 1991.

Lee, Hansuk, et al., "Full-field optical measurement of curvature in ultra-thin-film-substrate systems in the range of geometrically non-linear deformations," Journal of Applied Physics, vol. 89, No. 11, 2001.

Park et al., "Measurement of full-field curvature and geometrical instability of thin film-substrate systems through CGS Interferometry", Journal of the Mechanics and Physics of Solids, vol. 51, 2003.

Tippur, Hareesh, V., et al., "Simultaneous and real-time measurement of slope and curvature fringes in thin structures using shearing interferometry," Optical Engineering, vol. 43, No. 12, Dec. 2004.

Huang et al., "Apparatus for measuring local stress of metallic films, using an array of parallel laser beams during rapid thermal processing", Measurement Science and Technology, vol. 21, 2010.

Patorski, "Generation of the derivative of out-of-plane displacements using conjugate shear and moire interferometry", Applied Optics, vol. 25, No. 18, Sep. 15, 1986.

Heise, Ulrich, "A Moire Method for Measuring Plate Curvature," Experimental Mechanics, pp. 47-48.

Chiang et al., "Laser speckle interferometry for plate bending problems", Applied Optics, vol. 15, No. 9, Sep. 1976.

Hung et al., "Simultaeneous Measurement of Three Displacement Derivatives Using a Multiple Image-Shearing Interferometric Camera," Journal of Strain Analaysi, vol. 14, No. 3, 1979.

Periasamy et al., "Full-field digital gradient sensing method for evaluating stress gradients in transparent solids", Applied Optics, vol. 51, No. 12, Apr. 20, 2012.

Periasamy et al., "Measurement of Orthogonal Stress Gradients Due to Impact Load on a Transparent Sheet Using Digital Gradient Sensing Method", Experimental Mechanics, vol. 53, 2013.

Chen et al., "Digital speckle-displacement measurement using a complex spectrum method", Applied Optics, vol. 32, No. 11, Apr. 10, 1993.

Chu et al., "Applications of Digital-Image-Correlation Techniques to Experimental Mechanics", Experimental Mechanics, Sep. 1985.

Sutton et al., "Image Correlation for Shape, Motion and Deformation Measurements", Berlin: Springer, 2009 (Copy available upon request).

Kirugulige, Madhu S., et al., "Measurement of transient deformations using digital image correlation method and high-speed photography: application to dynamic fracture," Applied Optics, vol. 46, No. 22, Aug. 1, 2007.

Tippur et al., "A coherent gradient sensor for crack tip deformation measurements: analysis and experimental results", International Journal of Fracture 48, 1991.

Rosakis et al,. "Full field measurements of curvature using coherent gradient sensing: application to thin film characterization", This Solid Films 325, 1998.

Pirodda, "Shadow and projection moire techniques for absolute or relative mapping of surface shapes", Optical Engineering, vol. 21, No. 4, Jul./Aug. 1982.

\* cited by examiner

DETERMINING GEOMETRIC CHARACTERISTICS OF REFLECTIVE SURFACES

CROSS-REFERENCE TO RELATED APPLICATIONS

This application is a divisional of U.S. patent application Ser. No. 14/326,856, filed on Jul. 9, 2014, and entitled "Determining Geometric Characteristics of Reflective Surfaces," which claims the benefit of U.S. Provisional Patent Application Ser. No. 61/844,157, filed on Jul. 9, 2013, and entitled "A Full-Field Digital Gradient Sensing Method for Optically Measuring Slopes and Curvatures of Thin Reflective Structures," the entire disclosures of which are incorporated herein by reference.

BACKGROUND

Physical structures and, in particular, thin structures in aerospace, electronics, and other industries are often subjected to thermo-mechanical stresses and/or other loads that cause the surface of those structures to change. In other words, applied loads cause the surface topography and therefore the curvature of the structures to change. Such applied loads may be the result of a process over time (e.g., the drying of an epoxy or coating on the surface of the structure) or an instantaneously applied thermal or mechanical load (e.g., from another object applying a mechanical force to the structure over a particular region). Oftentimes, it is critical to a particular application to know whether the surface of the structure is flat or otherwise.

In the past, optical metrology tools such as shearing interferometry and moiré-based methods have been employed to quantify surface slopes and curvatures of a structure's surface. However, those methods generally require special conditions and/or destructive or contact testing of the structure to make such a determination. For example, depending on the particular implementation, the method may require Ronchi rulings or grid patterns, monochromatic coherent (e.g., laser) light, transparent structures, and/or coating the structure with a thin metallic film or other substance (e.g., having a specific pattern) in order to deduce the surface geometry.

SUMMARY

According to one aspect of the present disclosure, a system for determining geometric characteristics of reflective surfaces may include a specimen, a target structure, and an imaging system. The specimen may include a reflective surface, and the target structure may include a plurality of feature points configured to be reflected in the reflective surface. The imaging system may include a camera configured to capture an image of the reflective surface, the captured image including the plurality of features points of the target structure.

In some embodiments, the imaging system may be further configured to determine one or more surface slopes of the reflective surface based on displacements of the plurality of feature points in the captured image relative to a reference image including the plurality of feature points. The imaging system may determine the one or more surface slopes of the reflective surface by applying a digital image correlation algorithm to the captured image and the reference image. In some embodiments, the imaging system may be further configured to determine a directional curvature of the reflective surface at one or more points based on the one or more surface slopes. The imaging system may be further configured to determine a twist curvature of the reflective surface at one or more points based on the one or more surface slopes and/or determine a surface topography of the reflective surface at one or more points based on the one or more surface slopes.

In some embodiments, the camera is configured to capture a first image of the reflective surface with an applied load and a second image of the reflective surface without the applied load, wherein the second image is the reference image. At least one of the target structure or the reflective surface may be positioned on a plane that is not perpendicular to an optical axis of the camera. The reflective surface may be configured to reflect light of one or more wavelengths from the target structure to the camera.

According to another aspect of the present disclosure, a method of determining geometric characteristics of reflective surfaces may include capturing an image of a reflective surface of a specimen with a camera, wherein a plurality of feature points of a target structure are reflected in the reflective surface such that the plurality of features points are present in the captured image, and determining one or more surface slopes of the reflective surface based on displacements of the plurality of feature points in the captured image relative to a reference image including the plurality of feature points. In some embodiments, determining the one or more surface slopes of the reflective surface may include applying a digital image correlation algorithm to the captured image and the reference image and/or determining the one or more slopes based on a distance traveled by light directed from the target structure to the specimen.

In some embodiments, the distance traveled by the light directed from the target structure to the specimen may be equal to a sum of a distance between the target structure and a beam splitter and a distance between the beam splitter and the specimen. The method may further include determining at least one of a curvature or a surface topology of the reflective surface based on the one or more surface slopes. In some embodiments, the method may further include determining displacements of the plurality of features points in each of two perpendicular directions within a plane coincident with the target structure.

According to yet another aspect of the present disclosure a method for determining geometric characteristics of reflective surfaces may include sensing electromagnetic waves with a sensor, wherein the electromagnetic waves have been reflected off a reflective surface of a specimen from a target structure including a feature point, determining a displacement of the feature point of the target structure indicated by the sensed electromagnetic waves relative to reference data indicating a reference location for the feature point, and determining a surface slope of a point of the reflective surface based on the determined displacement of the feature point of the target structure.

In some embodiments, sensing the electromagnetic waves may include capturing an image with a camera. The method may further include determining at least one of a curvature or a surface topology of the reflective surface based on the surface slope. In some embodiments, determining the surface slope of the point of the reflective surface may include determining the surface slope based on a distance traveled by electromagnetic waves directed from the target structure to the specimen.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
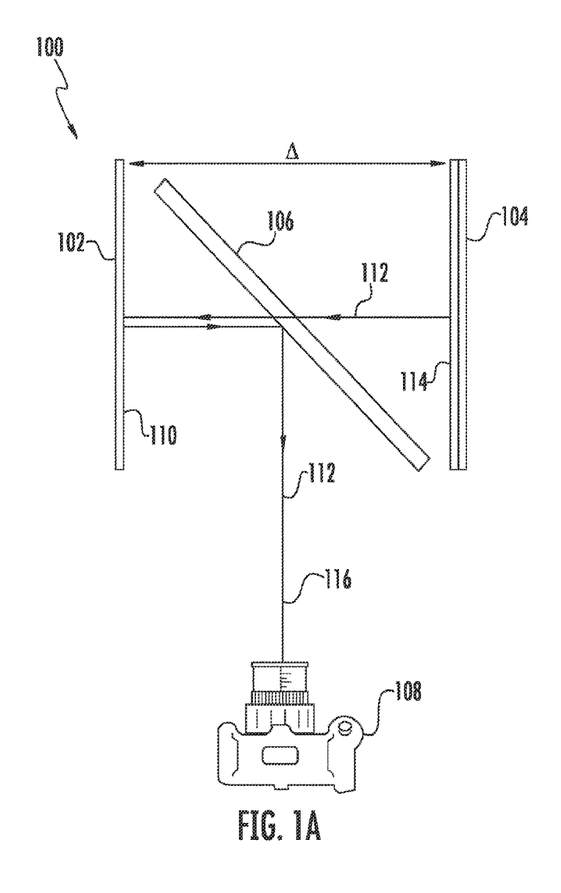
FIGS. 1A and 1B are simplified schematic diagrams of two embodiments of a system for determining geometric characteristics of reflective surfaces.

Referring now to FIG. 1A, a simplified schematic diagram of one illustrative embodiment of a system 100 for determining geometric characteristics of reflective surfaces is shown. As shown, the illustrative system 100 includes a specimen 102, a target structure 104, a beam splitter 106, and a camera 108. In use, as discussed in more detail below, the system 100 is configured to determine various geometric characteristics of a reflective surface 110 of the specimen 102. For example, the system 100 may determine the slope, curvature, twist, and/or surface topography of the specimen 102 resulting from an applied load (e.g., a process, environment-based load, mechanical load, or a combination thereof). More specifically, in the illustrative embodiment, the system 100 employs optical metrology (i.e., uses light as a measuring probe) to determine microscopic angulations associated with a slope of the reflective surface 110. In other embodiments, the system 100 may utilize photogeometry or another suitable technique for using electromagnetic waves (e.g., light) as a measuring probe.

In some embodiments, the system 100 may determine the amount by which the surface 110 of the specimen 102 has deformed relative to a flat surface, whereas in other embodiments, the system 100 may determine the amount by which the surface 110 has deformed relative to some other reference shape's surface (e.g., a previous shape of the specimen 102 prior to undergoing a process). In the illustrative embodiment, the system 100 makes those calculations and/or determinations using an imaging system 200 (see FIG. 2). As described below, in some embodiments, the imaging system 200 may include the camera 108, may be communicatively coupled to the camera 108, or may be embodied as the camera 108.

It should be appreciated that, in the illustrative embodiment, the system 100 determines the geometric characteristics of the reflective surface 110 of the specimen 102 without applying a coating (e.g., grid pattern) or otherwise damaging the specimen 102. As such, in such embodiments, the specimen 102 may be used for its designed purpose subsequent to the system 100 determining its geometric characteristics.

The specimen 102 may be embodied as any structure having a reflective surface 110 capable of reflecting an information carrier 112 (e.g., light) and that is otherwise suitable for use with the system 100 as described herein. As indicated above, the system 100 determines (with the imaging system 200) the geometric characteristics of the reflective surface 110 of the specimen 102. Accordingly, the specimen 102 may be any physical structure having a reflective surface 110 for which one may be interested in determining its shape. For example, in various embodiments, the specimen 102 may be embodied as a silicon wafer, a mirror, a solar panel, an antenna, or another reflective structure. In some embodiments, the reflective surface 110 of the specimen 102 is generally flat when a load (e.g., thermodynamic or mechanical) is not applied to the specimen 102. Additionally, the reflective surface 110 may be nominally reflective relative to the wavelength(s) of light 112 directed from the target structure 104 to the specimen 102 and to the camera 108. For example, in some embodiments, the "roughness" of the reflective surface 110 is less than those wavelengths of light 112.

Although the system 100 is generally described herein as involving reflected light 112, in other embodiments, the information carrier may be an electromagnetic wave 112 of any combination of wavelengths (e.g., a singleton or linear combination of wavelengths) provided that the reflective surface 110 (e.g., by itself or by means of coating it with a reflective material) can reflect that combination of electromagnetic waves 112 and its intensity pattern can be recorded by the camera 108 or another suitable sensor 210. In such embodiments, it should be appreciated that the system 100 includes a target structure 104 having corresponding features that can be reflected in the reflective surface 110 by those particular electromagnetic waves 112 (e.g., at those combinations of wavelengths) and a sensor 210 that is configured to sense and process (e.g., digitize) those electromagnetic waves 112. Additionally, a surface that appears visually to be a matte or non-reflective surface may be reflective at other wavelengths. For example, a black matte finished surface may not reflect "white light" but likely does reflect infrared waves. Accordingly, the system 100 may be configured for use with different electromagnetic waves 112 and corresponding target structures 104 (e.g., depending on the particular specimen 102). For ease of discussion, the system 100 is described herein primarily with respect to light 112 and corresponding light reflections; however, it should be appreciated that the techniques described herein may be similarly employed with different electromagnetic waves 112 and corresponding sensors 210 and target structures 104.

The illustrative target structure 104 includes a plurality of distinguishable feature points that may be captured in an image (by the camera 108) such that the captured image/data may be compared to a reference image/data to determine the displacement of the feature point locations in the captured image relative to their corresponding locations in the reference image. The target structure 104 may be illuminated by a broad-band white light source. In some embodiments, the target structure 104 is embodied as a target plate or subplane that is coated with a random black and white speckle "pattern" on a surface 114 facing the beam splitter 106 (see, for example, FIGS. 4A-B). In particular, in the illustrative embodiment, the feature points on the target structure 104 are nonlinearly and randomly distributed across the target structure 104. In other words, when photographed, the target structure 104 may be captured as a stochastic grayscale image of varying intensities. As discussed above, the target structure 104 may include feature points that may be reflected in the reflective surface 110 of the specimen 102 depending on the particular electromagnetic waves 112 employed with the system 100. For example, in embodiments involving infrared (IR) light 112, the surface 114 of the target structure 104 includes an "IR signature" that serves as the speckles or feature points.

The beam splitter 106 may be embodied as any structure configured to direct light 112 partially from the target structure 104 to the reflective surface 110 of the specimen 102 and from the reflective surface 110 of the specimen 102 to the camera 108. That is, the beam splitter 106 is configured to allow a portion of light 112 (e.g., half) to pass through the beam splitter 106 and to reflect another portion of light 112 off the beam splitter 106. For example, in some embodiments, the beam splitter 106 may be embodied as a partial mirror. The system 100 is configured to permit the camera 108 to capture images of the target surface 114 (e.g., the speckle pattern) reflected in the reflective surface 110 of the specimen 102 by virtue of light 112 passing through the beam splitter 106. In embodiments of the system 100 in which other electromagnetic waves 112 are utilized, the beam splitter 106 is configured to perform similar functions. In the illustrative embodiment, the beam splitter 106 is positioned at a forty-five degree angle relative to each of the reflective surface 110 of the specimen 102 (in an unloaded state) and the surface 114 of the target structure 104 as shown in FIG. 1A; however, in other embodiments, the beam splitter 106 may be positioned in another suitable orientation. In yet other embodiments, it will be appreciated that the specimen 102, the target structure 104, and the camera 108 may be oriented relative to one another such that the beam splitter 106 may be omitted from the system 100 and the techniques described herein may still be employed (e.g., using slightly modified geometric calculations).

The camera 108 may be embodied as any peripheral or integrated device suitable for capturing images, such as a still camera, a video camera, or other device capable of capturing images. For example, in embodiments involving IR light 112, the camera 108 may be embodied as an IR camera or be otherwise configured to capture the IR light 112. Further, in embodiments in which other electromagnetic waves 112 are utilized, the camera 108 may be replaced or supplemented with one or more sensors 210 configured to sense those waves 112. In the illustrative embodiment, the beam splitter 106 is positioned at a forty-five degree angle relative to an optical axis 116 of the camera 108 as shown in FIG. 1A. As described below, in some embodiments, the camera 108 may form a portion of an imaging system 200, which is not shown in FIG. 1A for clarity.

As shown in FIG. 1A, in the illustrative system 100, the target structure 104 is oriented within a plane that is parallel to a corresponding plane within which the reflective surface 110 of the specimen (in an unloaded state) is oriented and that is parallel to the optical axis 116 of the camera 108. Further, neither the target structure 104 nor the specimen 102 is positioned along the optical axis 116 of the camera 108. The distance, Δ, between the reflective surface 110 of the specimen 102 and the surface 114 of the target structure 104 is predetermined in the illustrative embodiment and may vary depending on the particular embodiment. The distance, Δ, may be used in determining various geometric characteristics of the reflective surface 110 as described below.

Figure 1B:
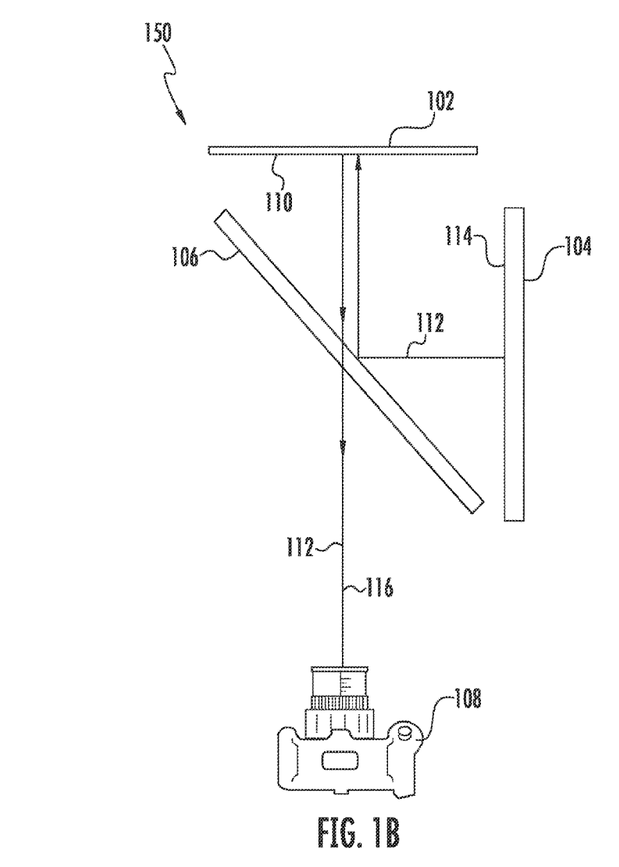

It should be appreciated that a system 150 having the configuration shown in FIG. 1B may also be used to employ the techniques described herein. The system 150 of FIG. 1B may use the same components as the system 100 of FIG. 1A but arranged in a different orientation. In particular, in the illustrative system 150, the optical axis 116 of the camera 108 passes through the specimen 102, and the reflective surface 110 (in an unloaded state) is oriented orthogonally to the optical axis 116. Additionally, the target surface 114 is positioned within a plane parallel to the optical axis 116. It should be appreciated that, in each of the systems 100, 150, the distance, Δ, may be determined as the sum of the distance between the target surface 114 and the beam splitter 106 and the distance between the beam splitter 106 and the reflective surface 110. For ease of discussion, the techniques may be described herein with reference to the system 100 of FIG. 1A; however, it should be appreciated that the techniques equally apply to the system 150 of FIG. 1B. Further, in some embodiments, the components of the system 100 may be positioned in other suitable orientations relative to one another (e.g., using angles other than ninety and forty-five degrees).

Figure 2:
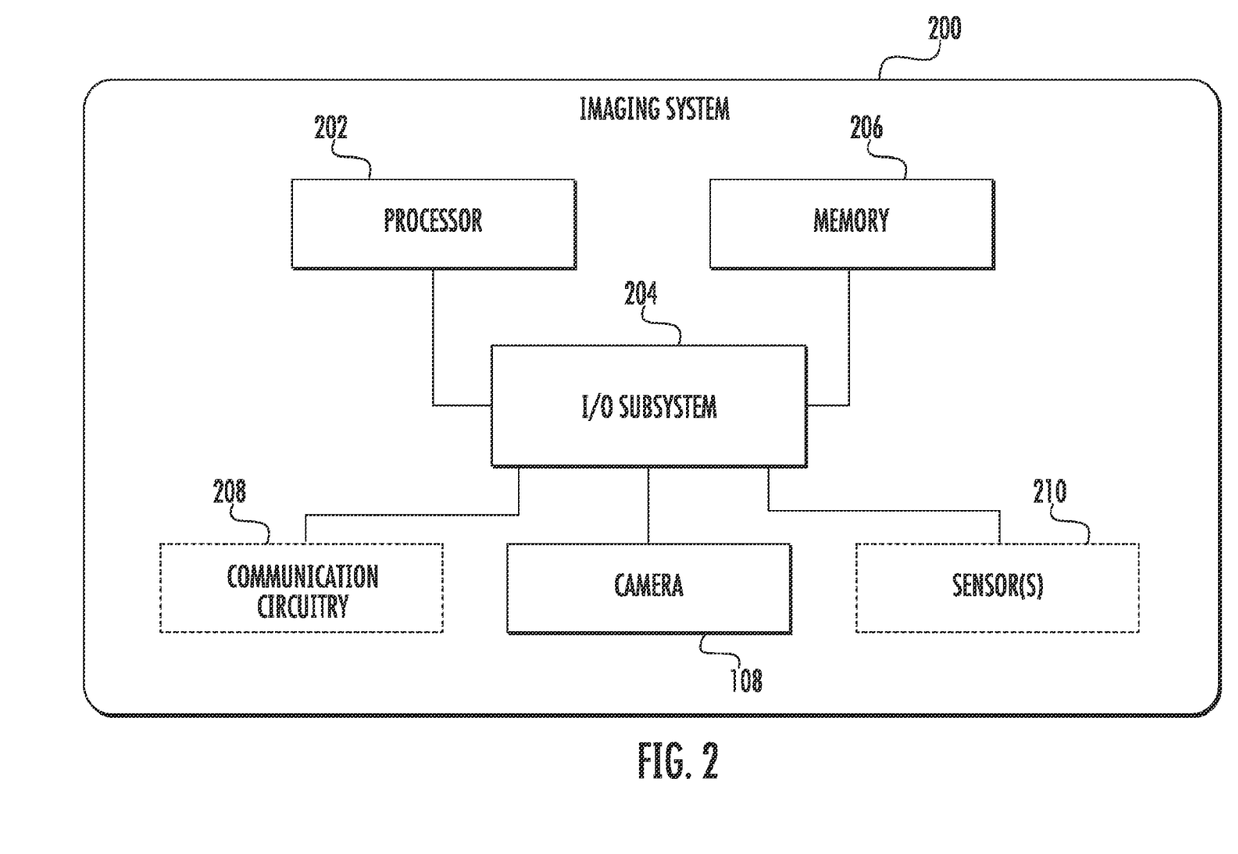
FIG. 2 is a simplified block diagram of an imaging system employed by the system of FIGS. 1A and 1B.

As indicated above, the system 100 may determine various geometric characteristics of the reflective surface 110 of the specimen (e.g., slopes, curvatures, twists, topology, etc.) with the imaging system 200. Referring now to FIG. 2, the illustrative imaging system 200 may be embodied as any type of computing device(s) capable of performing the functions described herein. The imaging system 200 includes a number of electronic components commonly associated with imaging systems. In the illustrative embodiment, the imaging system 200 includes a processor 202, an input/output ("I/O") subsystem 204, a memory 206, and the camera 108. As described below, the imaging system 200 may also include communication circuitry 208 (e.g., to communicate with remote devices). Further, in some embodiments, the imaging system 200 may include one or more sensors 210 (e.g., in addition to, or in place of, the camera 108). It will be appreciated that the imaging system 200 may include additional or different components, such as those commonly found in an imaging system and/or computing device. Additionally, in some embodiments, one or more of the illustrative components of the imaging system 200 may be incorporated in, or otherwise form a portion of, another component of the imaging system 200 (e.g., as with a microcontroller).

The processor 202 of the imaging system 200 may be embodied as any type of processor(s) capable of performing the functions described herein. For example, the processor 202 may be embodied as one or more single or multi-core processors, digital signal processors, microcontrollers, or other processors or processing/controlling circuits. Similarly, the memory 206 may be embodied as any type(s) of volatile or non-volatile memory or data storage device capable of performing the functions described herein. The memory 206 stores various data and software used during operation of the imaging system 200, such as operating systems, applications, programs, libraries, and drivers. For instance, the memory 206 may store instructions in the form of a software routine (or routines) which, when executed by the processor 202, allows the imaging system 200 to control operation of the imaging system 200 (e.g., to capture images with the camera 108) and process the images to compute the various surface characteristics of the specimen.

The memory 206 is communicatively coupled to the processor 202 via the I/O subsystem 204, which may be embodied as circuitry and/or components to facilitate I/O operations of the imaging system 200. For example, the I/O subsystem 204 may be embodied as, or otherwise include, memory controller hubs, I/O control hubs, firmware devices, communication links (e.g., point-to-point links, bus links, wires, cables, light guides, printed circuit board traces, etc.), and/or other components and subsystems to facilitate the I/O operations. In the illustrative embodiment, the I/O subsystem 204 includes an analog-to-digital ("A/D") converter, or the like, that converts analog signals from the camera 108 and the sensors 210 of the imaging system 200 into digital signals for use by the processor 202 (i.e., to digitize the sensed data). It should be appreciated that, if any one or more of the camera 108 and/or the sensors 210 associated with the imaging system 200 generate a digital output signal, the A/D converter may be bypassed. Similarly, the I/O subsystem 204 may include a digital-to-analog ("D/A") converter, or the like, that converts digital signals from the processor 202 into analog signals for use by various components of the imaging system 200.

In some embodiments, the data captured by the camera 108 and/or the sensors 210 may be transmitted to a remote computing device (e.g., a cloud computing device) for analysis. In other words, the determination of the geometric characteristics of the reflective surface 110 may be determined by a remote computing device based on the sensed data. Accordingly, the imaging system 200 may include communication circuitry 208, which may be embodied as any communication circuit, device, or collection thereof, capable of enabling communications between the imaging system 200 and remote devices. The communication circuitry 208 may be configured to use any one or more communication technology (e.g., wireless or wired communications) and associated protocols (e.g., Ethernet, Bluetooth®, WiFi®, WiMAX, etc.) to effect such communication.

As indicated above, the system 100 may be configured to use any electromagnetic wave 112 that may be reflected off the reflective surface 110 of the specimen 102. In such embodiments, the system 100 may utilize sensors 210, different from the camera 108, to capture the electromagnetic waves 112. As such, the sensors 210 may be embodied as any type of sensors suitable for capturing such electromagnetic waves 112.

Figure 3A:
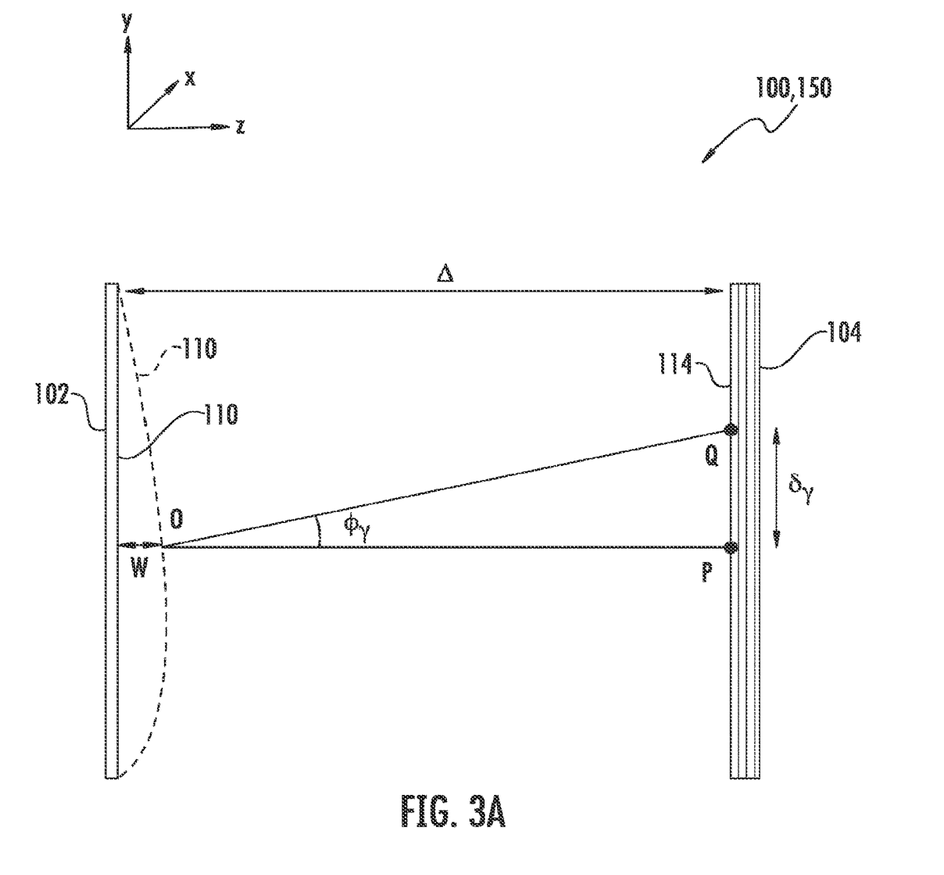
FIG. 3A is a simplified two-dimensional spatial diagram illustrating an optical path between a target structure and a specimen of the systems of FIGS. 1A and 1B.
Figure 3B:
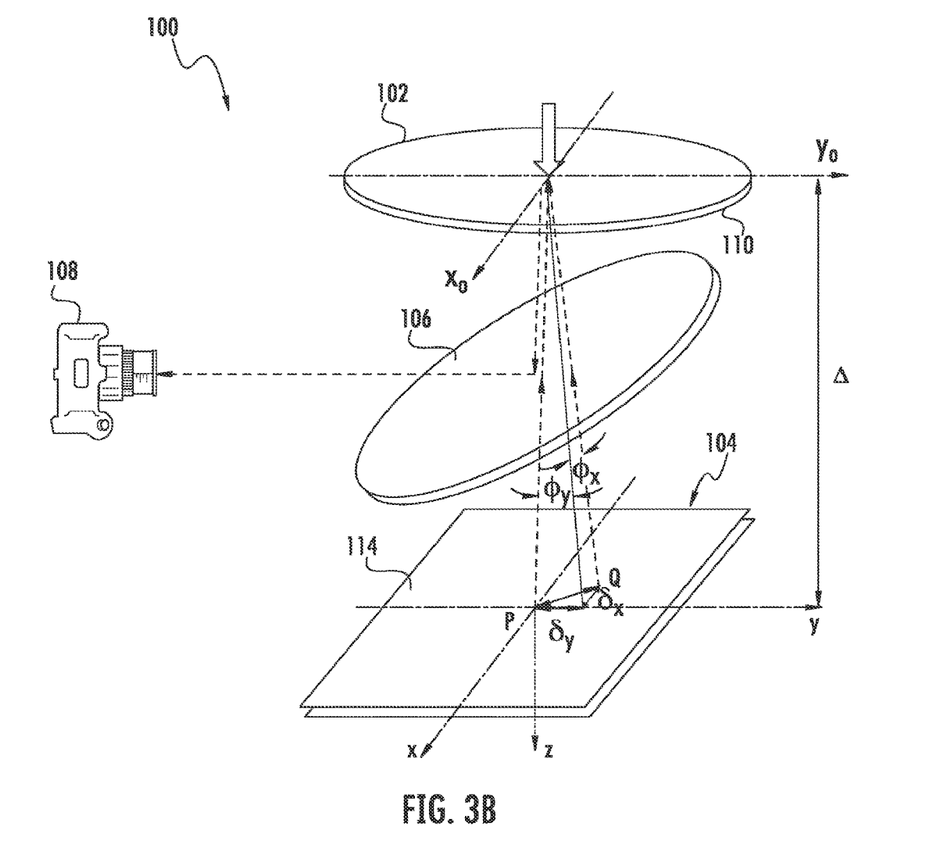
FIG. 3B is a simplified three-dimensional spatial diagram illustrating an optical path from the target structure to the camera of the system of FIG. 1A.

Referring now to FIG. 3A, a simplified spatial diagram illustrating optical paths between the target structure 104 and the specimen 102 of the system 100 and corresponding geometric relationships is shown. Although the system 100 is only shown in two dimensions (i.e., as a top view), it should be appreciated that the target structure 104 and the specimen 102 are generally three-dimensional structures. For example, it will be appreciated that FIG. 3B is a three-dimensional representation of FIG. 3A. More specifically, FIG. 3B illustrates the optical path from the target structure 104 to the camera 108 in at least one embodiment of the system 100 of FIG. 1A. In the illustrative embodiment, the reflective surface 110 of the specimen 102 is generally flat and undeformed when a load is not applied to the surface 110. In such circumstances, the incident and reflected rays of the reflective surface 110 of the specimen 102 are collinear and may be considered to be parallel to the optical axis 116 of the camera 108 due to the beam splitter 106. In other words, $\overline{OP}$ is coincident with $\overline{OQ}$.

When the reflective surface 110 undergoes an out-of-plane deformation, w, (e.g., a "bulge" due to an applied load), the light ray $\overline{OP}$ is deflected to $\overline{OQ}$ by an angle $\phi_y$, which is equal to the angle of incidence plus the angle of reflection. Similarly, $\overline{OP}$ is deflected by an angle $\phi_x$ in an orthogonal direction (e.g., in an x-z plane). Accordingly, the point Q is brought into focus instead of the point P, which was originally in focus. That is, after deformation, the point P is replaced by the point Q, so the point Q is now captured through the point O on the reflective surface 110. In other words, the camera 108 captures the feature point(s) located at point Q on the target structure 104 for the particular image pixel rather than the feature point(s) located at point P on the target structure 104. Of course, it should be appreciated that the other image pixels captured by camera 108 may similarly vary due to the deflection.

As indicated above, the surface 114 of the target structure 104 includes a plurality of feature points that are, for example, stochastically distributed. Accordingly, in the illustrative embodiment, the imaging system 200 applies a digital image correlation (DIC) algorithm to determine the displacements $\delta_y$ and/or $\delta_x$, which are the relative displacements associated with the deflections by the angles $\phi_y$ and $\phi_x$ discussed above. More specifically, in order to determine those displacements $\delta_y$ and/or $\delta_x$, the imaging system 200 compares an image 402 captured by the camera 108 of the target surface 114 during (or after) the applied load (see FIG. 4A) to a reference image 404 of the target surface 114 prior to or otherwise without enduring the applied load (see FIG. 4B). Some illustrative DIC algorithms are described in Chen et al., "Digital Speckle-Displacement Measurement Using a Complex Spectrum Method," 32 Appl. Opt. 1839-49 (1993); Chu et al., "Application of Digital Image Correlation Techniques to Experimental Mechanics," 25 Exp. Mech. 232-44 (1985); and Sutton et al., "Image Correlation for Shape, Motion, and Deformation Measurements," Berlin: Springer (2009). In other embodiments, the imaging system 200 may utilize any other suitable feature matching algorithm (instead of DIC) for determining the relative displacements.

Figure 4A:
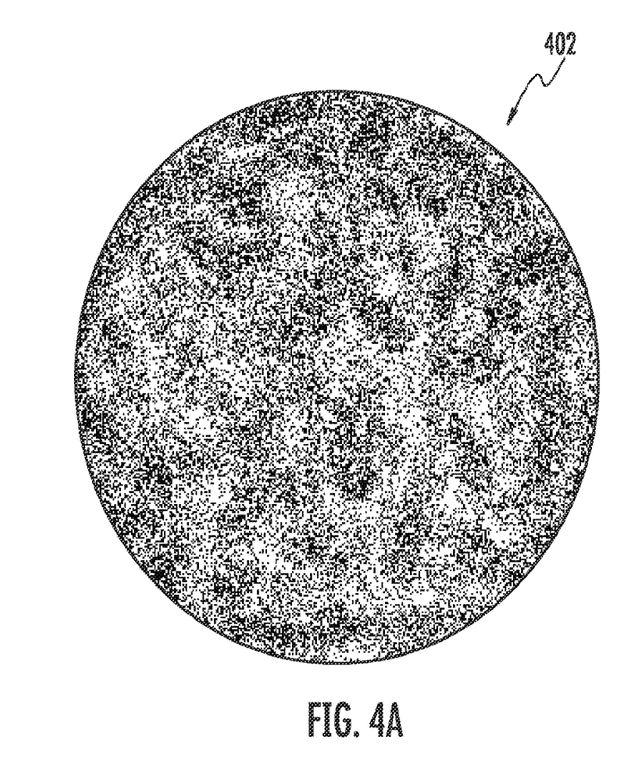
FIGS. 4A and 4B are exemplary images of the target structure captured by the camera of the systems of FIGS. 1A and 1B.
Figure 4B:
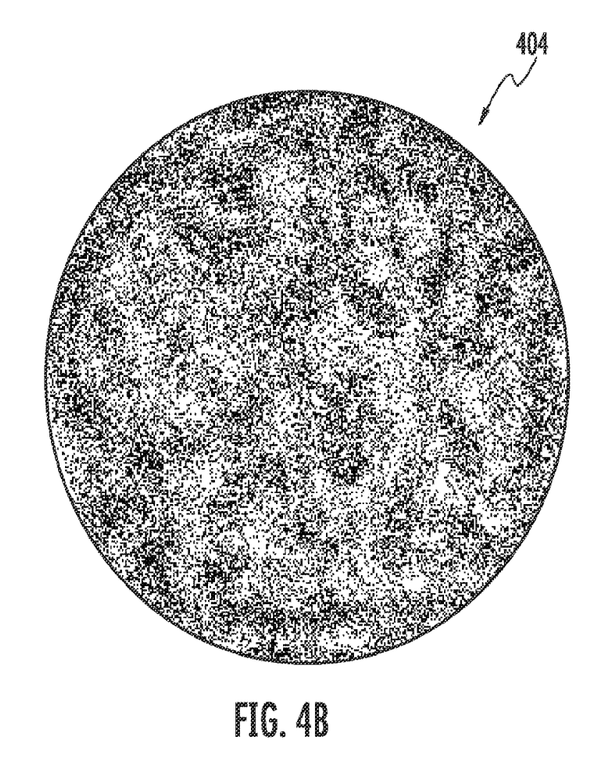

It should be appreciated that the feature points represented in the image 402 are shifted relative to the feature points in the reference image 404 due to the deformation of the reflective surface 110 of the specimen 102. In some embodiments, the reference image 404 may be captured by the camera 108 prior to the reflective surface 110 enduring the applied load. In other embodiments, the specimen 102 may be temporarily replaced with, for example, an optical trial of the general shape (e.g., flat) against which the shape of the reflective surface 110 of the specimen 102 is to be compared, and the camera 108 captures the reference image 404 of the target surface 114 reflected in the optical trial rather than the reflective surface 110. In yet other embodiments, the reference image 404 may be otherwise generated or provided (e.g., as a standalone reference image associated with the target surface 114). Of course, in embodiments in which images are not used in the system 100, 150, other suitable reference data may be used.

It should be appreciated that, in some embodiments, each of the two images 402, 404 is stored and/or processed as a two-dimensional array of light intensities. For example, in a monochromatic (i.e., grayscale) digital image, each pixel represents an intensity value of the captured light 112 (e.g., between 0 and 255 for an 8-bit image). In the illustrative embodiment, the imaging system 200 analyzes the images 402, 404 (e.g., using DIC) to determine a distance that each point has been displaced (e.g., in the x and/or y direction(s)) in the captured image 402 relative to the reference image 404. In other words, the imaging system 200 may determine how much each point has been displaced relative to its location with the specimen 102 in its original, undeformed state. In some embodiments, the displacements $\delta_y$ and $\delta_x$ are generated by the imaging system 200 as distance values in a two-dimensional array. As indicated above, such displacements are a result of light 112 incident on the reflective surface 110 of the specimen 102 being deflected proportionally to the curvature or slope of the surface 110.

In the illustrative embodiment, the imaging system 200 calculates the local surface slopes $$\frac{\partial w}{\partial x}$$

and $$\frac{\partial w}{\partial y}$$

according to $$\frac{\partial w}{\partial x:y} = \frac{1}{2}\tan(\phi_{x:y}).$$

However, as discussed above, the system 100, 150 is configured to determine microscale changes in the slope of the reflective surface 110 and therefore $$\tan(\phi_{x:y}) \cong \frac{\delta_{x:y}}{\Delta}$$

due to the small angles. Accordingly, the imaging system 200 may calculate the local surface slopes $$\frac{\partial w}{\partial x}$$

and $$\frac{\partial w}{\partial y}$$

according to $$\frac{\partial w}{\partial x:y} \cong \frac{1}{2}\frac{\delta_{x:y}}{\Delta}$$

based on the displacements $\delta_y$ and $\delta_x$ and the distance $\Delta$ between the reflective surface 110 and the target surface 114. That is, the imaging system 200 may calculate the slope $$\frac{\partial w}{\partial x}$$

of the reflective surface 110 in the x-direction as $$\frac{1}{2}\frac{\delta_x}{\Delta}$$

and the slope $$\frac{\partial w}{\partial y}$$

of the reflective surface 110 in the y-direction as $$\frac{1}{2}\frac{\delta_y}{\Delta}.$$

Figure 5A:
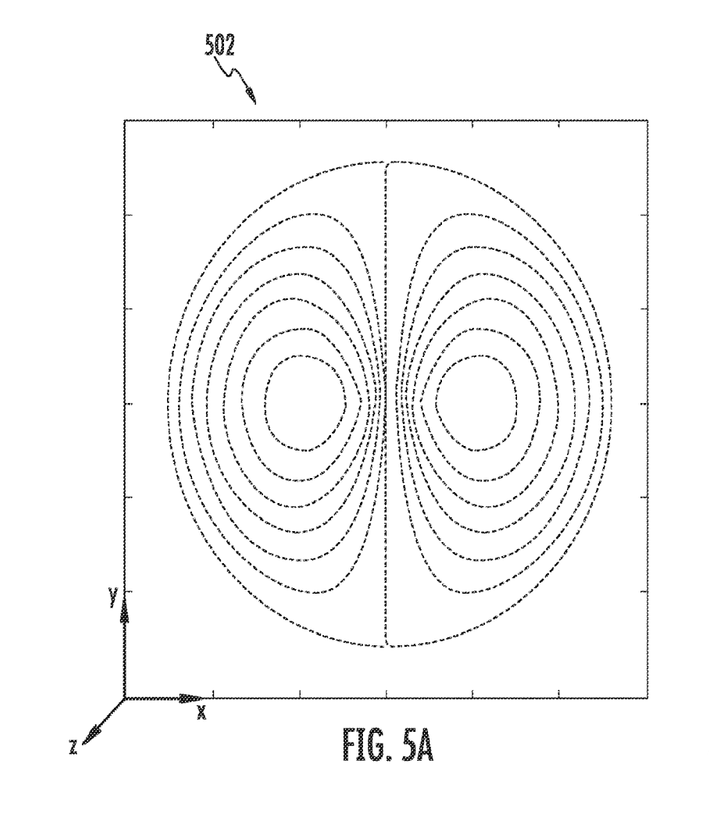
FIGS. 5A and 5B are simplified contour diagrams of determined slopes of a surface of the specimen of FIGS. 1A and 1B.
Figure 5B:
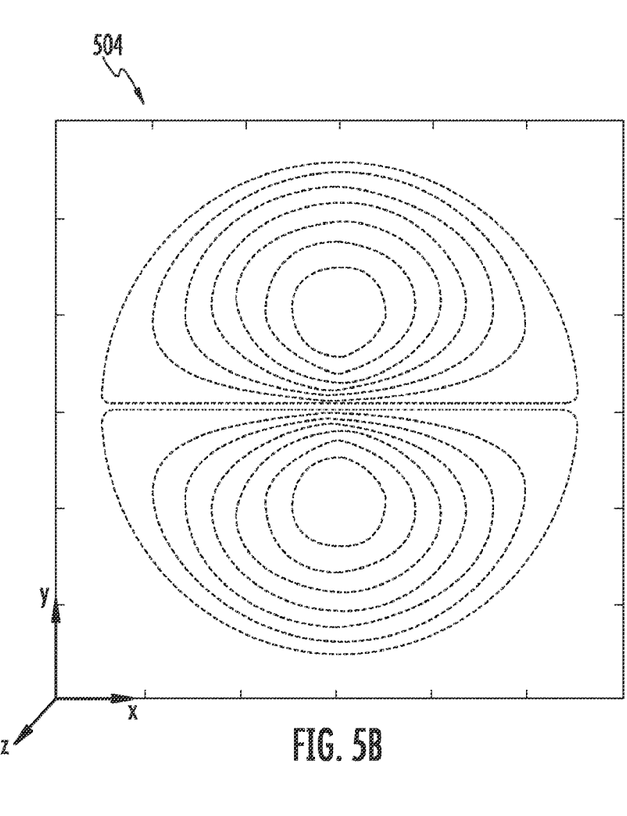

In the illustrative embodiment, coordinates on a plane coincident with the reflective surface 110 of the specimen 102 (in an unloaded state) are utilized to determine the slopes, but the displacements are determined based on coordinates of the surface 114 of the target structure 104. Accordingly, in such embodiments, the imaging system 200 may utilize a linear mapping of coordinates between the planes of the reflective surface 110 and the target surface 114 to account for this. At least one technique for doing so is described in Periasamy, et al., "A Full-Field Digital Gradient Sensing Method for Evaluating Stress Gradients in Transparent Solids," 51 Appl. Opt. 2088-97 (2012). Further, in some embodiments, the determined slopes $$\frac{\partial w}{\partial x}$$

and $$\frac{\partial w}{\partial y}$$

may be stored by the imaging system 200 as, for example, a two-dimensional array of slope values and may be represented visually by contour diagrams 502, 504, respectively, as shown in FIGS. 5A and 5B.

It should be appreciated that the diagrams 502, 504 of FIGS. 5A-B (as well as diagrams 602, 604, 702, 704, 802, 808 of FIGS. 6A-8B, described further below) correspond with the geometry associated with a mechanical load being applied to the center of a circular silicon wafer. In other words, a small (e.g., microscale) bulge is identified by the imaging system 200 due to the mechanical load. It should further be appreciated that, unlike optical interferometric and moiré methods, the imaging system 200 permits the slope fields to be determined using a single pair of data corresponding with the reflective surface 110 in undeformed and deformed states.

Figure 6A:
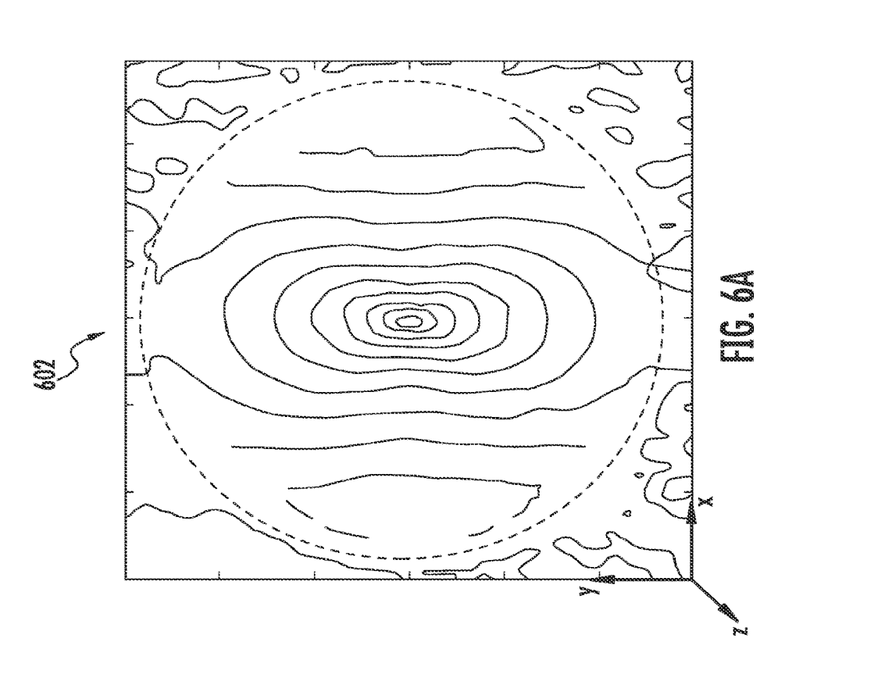
FIGS. 6A and 6B are simplified contour diagrams of determined curvatures of the surface of the specimen of FIGS. 1A and 1B.
Figure 6B:
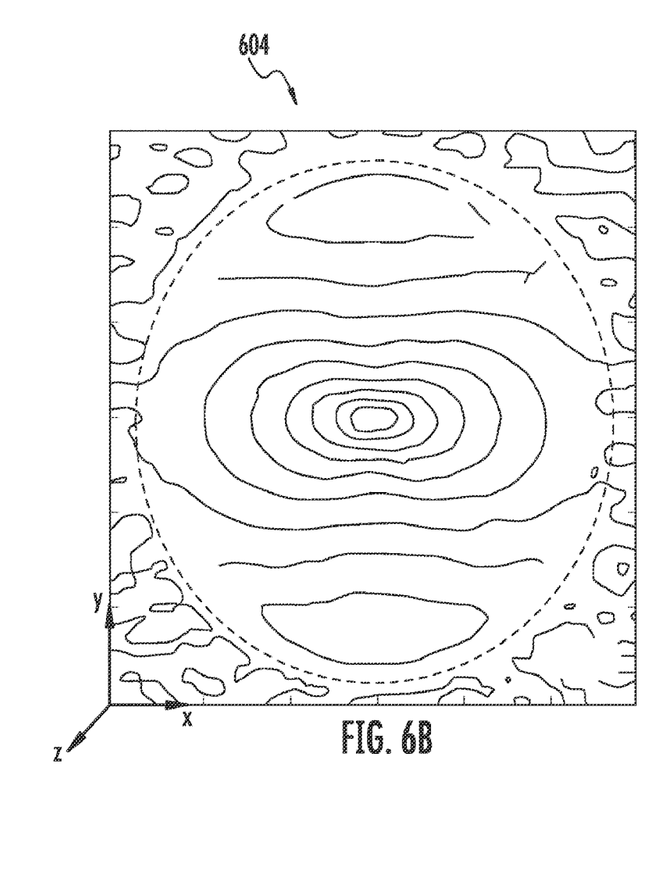

As discussed above, the imaging system 200 may utilize the slopes $$\frac{\partial w}{\partial x}$$

and $$\frac{\partial w}{\partial y}$$

to determine various other geometric characteristics of the reflective surface 110 of the specimen 102. For example, in the illustrative embodiment, the imaging system 200 utilizes numerical differentiation and/or another suitable algorithm or technique to determine various curvatures of the reflective surface 110 (e.g., directional curvatures and/or twist curvatures) based on the determined slopes. It should be appreciated that it may be desirable to determine the curvatures for any number of reasons including, for example, to determine the imposed or residual stress in a reflective substrate (e.g., a silicon wafer) which, if too high, may damage the substrate over time (e.g., by cracking). In particular, the imaging system 200 may calculate the directional curvature $$\frac{\partial^2 w}{\partial x^2}$$

according to $$\frac{\partial^2 w}{\partial x^2} = \frac{1}{2}\frac{\partial}{\partial x}\left(\frac{\delta_x}{\Delta}\right),$$

which is represented by the contour diagram 602 of FIG. 6A. Similarly, the imaging system 200 may calculate the directional curvature $$\frac{\partial^2 w}{\partial y^2}$$

according to $$\frac{\partial^2 w}{\partial y^2} = \frac{1}{2}\frac{\partial}{\partial y}\left(\frac{\delta_y}{\Delta}\right),$$

which is represented by the contour diagram 604 of FIG. 6B.

Figure 7A:
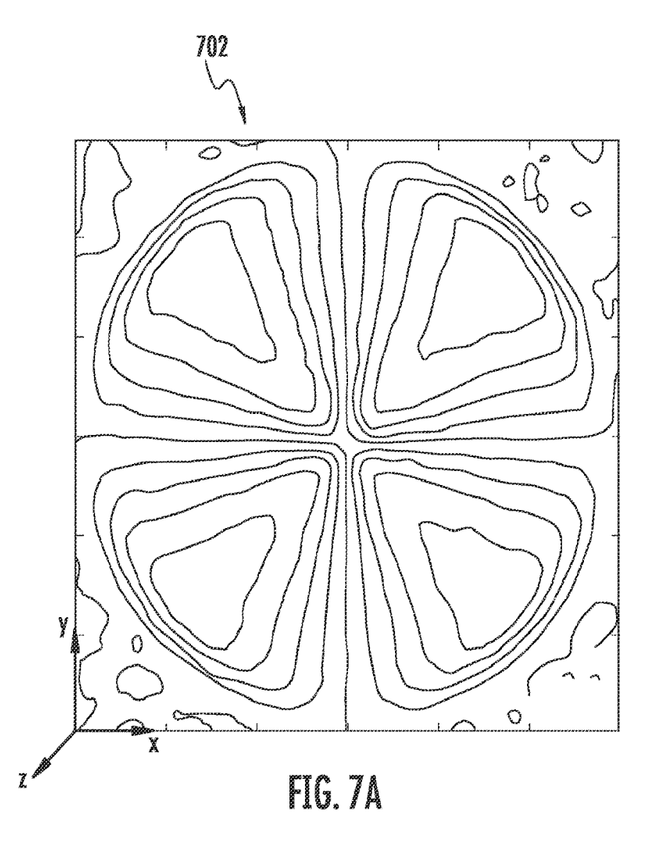
FIGS. 7A and 7B are simplified contour diagrams of determined twist curvatures of the surface of the specimen of FIGS. 1A and 1B.
Figure 7B:
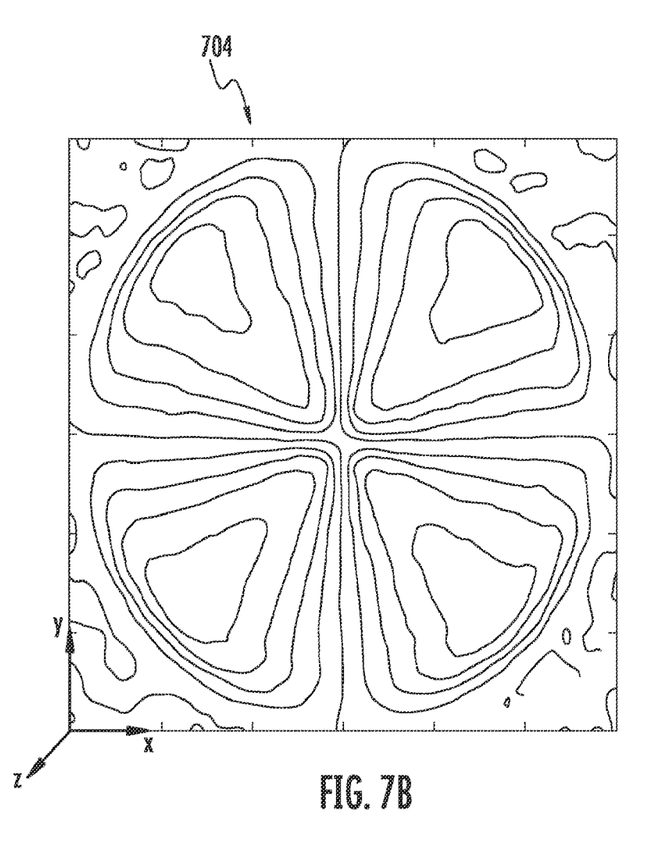

In some embodiments, the imaging system 200 may also utilize cross-partial differentiation to determine the twist curvature of the reflective surface 110 of the specimen 102. Specifically, the imaging system 200 may determine the twist curvature $$\frac{\partial^2 w}{\partial x \partial y}$$

according to $$\frac{\partial^2 w}{\partial x \partial y} = \frac{1}{2}\frac{\partial}{\partial x}\left(\frac{\delta_y}{\Delta}\right),$$

which is represented by the contour diagram 702 of FIG. 7A. Similarly, the imaging system 200 may determine the twist curvature $$\frac{\partial^2 w}{\partial y \partial x}$$

according to $$\frac{\partial^2 w}{\partial y \partial x} = \frac{1}{2}\frac{\partial}{\partial y}\left(\frac{\delta_x}{\Delta}\right),$$

which is represented by the contour diagram 704 of FIG. 7B. It will be appreciated that the contour diagrams 702, 704 are nearly identical, which is expected from the cross-partial differentiation of continuous functions (i.e., the surface topography of the reflective surface 110).

In the illustrative embodiment, the imaging system 200 also utilizes numerical integration and/or another suitable algorithm of technique to determine the surface topography of the reflective surface 110 (i.e., its shape) based on the determined slopes. For example, the imaging system 200 may integrate the determined x-directional slope $$\frac{\partial w}{\partial x}$$

over x in a region of interest between limits a and b (e.g., the entire surface 110 of the specimen 102) to determine the surface topography of the reflective surface 110. In particular, the imaging system 200 may determine the surface topography as $$\int_a^b \frac{\partial w}{\partial x} dx.$$

The imaging system 200 may also determine the surface topography of the reflective surface 110 in terms of the y-directional slope $$\frac{\partial w}{\partial y}$$

as $$\int_a^b \frac{\partial w}{\partial y} dy.$$

Figure 8A:
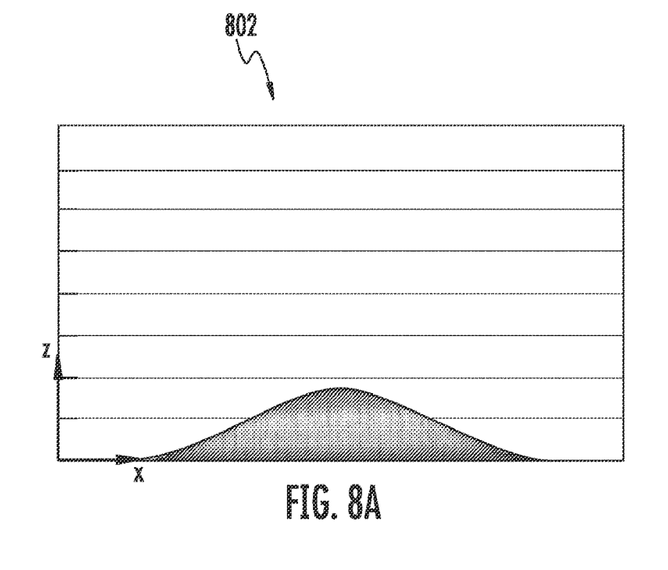
FIGS. 8A and 8B are simplified two-dimensional diagrams of a determined surface topography of the surface of the specimen of FIGS. 1A and 1B.
Figure 8B:
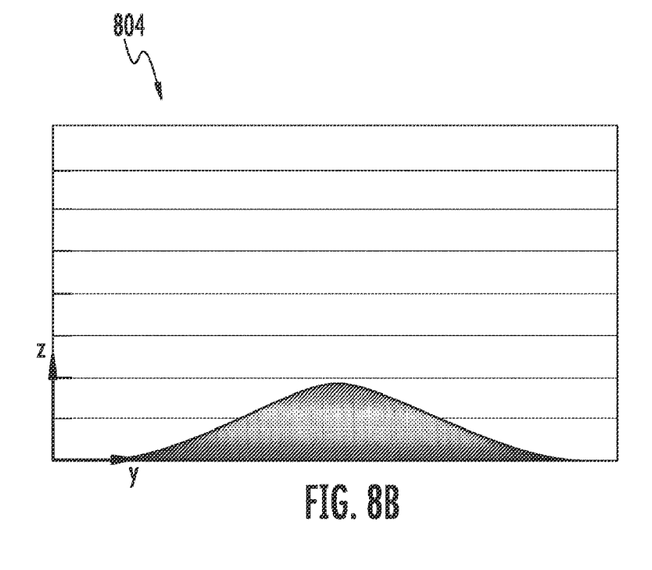
Figure 9A:
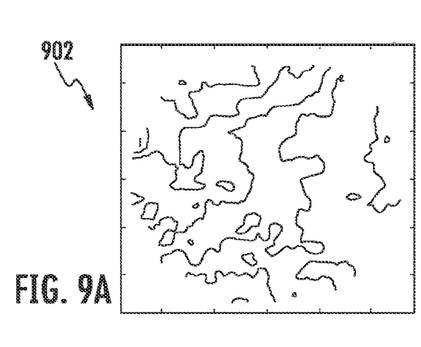
FIGS. 9A-9D and 10A-D are simplified contour diagrams of determined slopes of the surface of the specimen of FIGS. 1A and 1B monitored over a period of time during a process applied to the specimen.
Figure 9B:
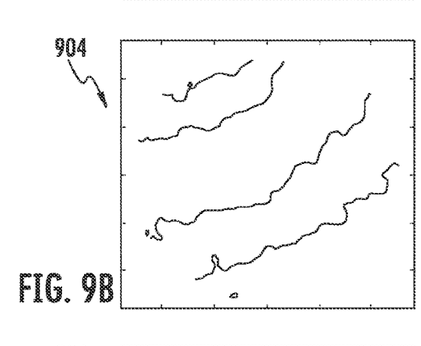
Figure 9C:
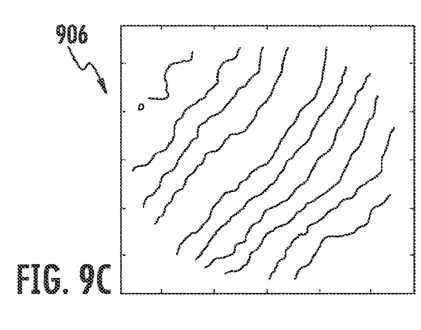
Figure 9D:
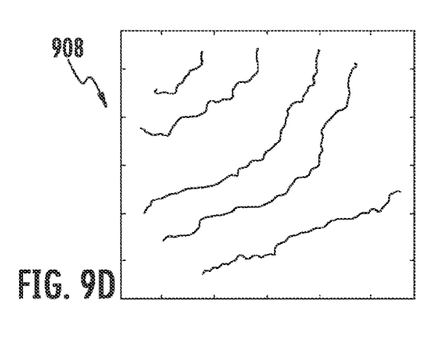
Figure 10A:
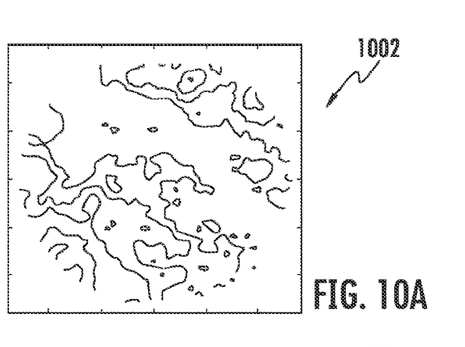
Figure 10B:
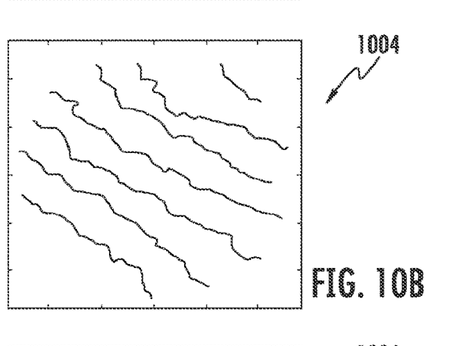
Figure 10C:
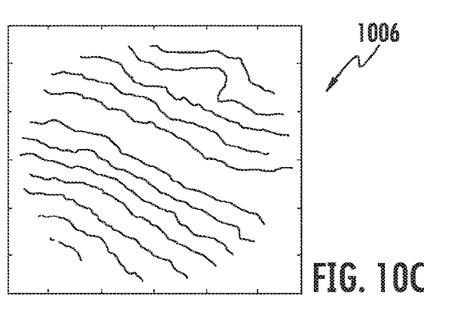
Figure 10D:
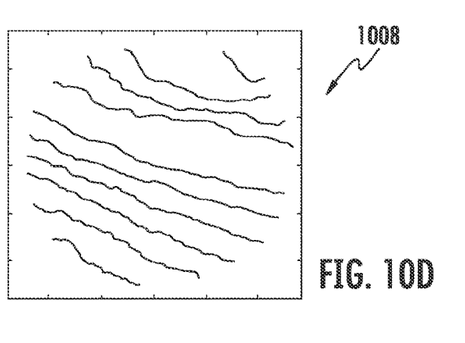

As shown in FIGS. 8A and 8B, the diagrams 802, 804 represent the determined surface topology of the reflective surface 110 according to integration in terms of x and integration in terms of y, respectively. As expected, the diagrams 802, 804 are nearly identical (with any deviation resulting from numerical, rounding, and/or other system errors).

In some embodiments, the imaging system 200 may determine various geometric characteristics of the reflective surface 110 of the specimen 102 over time (e.g., during a process). For example, in an embodiment, a polymer film (e.g., an epoxy film) may be applied to a silicon wafer, and the imaging system 200 may determine the surface slopes of the silicon wafer at various point in time as the polymer film cures on the wafer. Referring now to FIGS. 9A-10D, various contour diagrams are shown that represent those surface slopes. In particular, a contour diagram 902 represents the local slope $$\frac{\partial w}{\partial x}$$

of the reflective surface 110 of the silicon wafer at a first point in time (e.g., after 25 minutes from application of the polymer film). Similarly, a contour diagram 904 represents the local slope $$\frac{\partial w}{\partial x}$$

of the reflective surface 110 of the silicon wafer at a second later point in time (e.g., 35 minutes). Further, a contour diagram 906 represents the local slope $$\frac{\partial w}{\partial x}$$

of the reflective surface 110 of the silicon wafer at a third even later point in time (e.g., 45 minutes), and a contour diagram 908 represents the local slope $$\frac{\partial w}{\partial x}$$

of the reflective surface 110 at a fourth even later point in time (e.g., 55 minutes). Similarly, contour diagrams 1002, 1004, 1006, 1008 represent the local slope $$\frac{\partial x}{\partial y}$$

of the reflective surface 110 of the silicon wafer at the first point in time, at the second point in time, at the third point in time, and at the fourth point in time, respectively. It will be appreciated that the slopes $$\frac{\partial w}{\partial x}$$

and $$\frac{\partial x}{\partial y}$$

initially appear somewhat awry but converge to distinct slopes values over time, because the magnitudes of the slopes increase with time as the curing epoxy bends the silicon wafer in space.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A system for determining geometric characteristics of a reflective surface of a specimen, the system comprising:
   a target structure including a plurality of feature points, wherein the target structure is configured such that light from the plurality of feature points is to be reflected in the reflective surface of the specimen, wherein the target structure comprises a surface with a plurality of light regions and a plurality of dark regions, and wherein each feature point of the plurality of feature points comprises a point between a light region of the plurality of light regions and a dark region of the plurality of dark regions; and
   an imaging system including a camera, a processor, and a memory, the camera comprising a lens and an image sensor, the lens configured to focus the light from the plurality of features points and reflected from the reflective surface to create an image of the target structure on the image sensor and the image sensor configured to capture the image of the target structure, wherein the image of the target structure includes the plurality of feature points of the target structure.

2. The system of claim 1, wherein the imaging system is further configured to determine one or more surface slopes of the reflective surface based on displacements of the plurality of feature points in the captured image relative to a reference image including the plurality of feature points.

3. The system of claim 2, wherein to determine one or more surface slopes of the reflective surface comprises to apply a digital image correlation algorithm to the captured image and the reference image.

4. The system of claim 2, wherein the imaging system is further configured to determine a directional curvature of the reflective surface at one or more points based on the one or more surface slopes.

5. The system of claim 2, wherein the imaging system is further configured to determine a twist curvature of the reflective surface at one or more points based on the one or more surface slopes.

6. The system of claim 2, wherein the imaging system is further configured to determine a surface topography of the reflective surface at one or more points based on the one or more surface slopes.

7. The system of claim 2, wherein the captured image is of the reflective surface with a thermodynamic or mechanical load applied and the reference image is of the reflective surface without the thermodynamic or mechanical load applied.

8. The system of claim 1, wherein at least one of the target structure or the reflective surface is positioned on a plane that is not perpendicular to an optical axis of the camera.

9. The system of claim 1, wherein the reflective surface is configured to reflect light of one or more wavelengths from the target structure to the camera.

10. The system of claim 1, wherein the imaging system is further configured to determine one or more surface slopes of the reflective surface based on displacements of the plurality of feature points in the captured image relative to a reference image including the plurality of feature points.

11. The system of claim 10, wherein the target structure is illuminated by a broad-band white light source, wherein the image sensor is configured to capture the image formed by light from the broad-band white light source, and wherein to determine the one or more surface slopes of the reflective surface based on displacements of the plurality of feature points in the captured image comprises to determine the one or more surface slopes of the reflective surface based on displacements of the plurality of feature points in the captured image formed by light from the broad-band white light source.

12. The system of claim 10, wherein to determine the one or more surface slopes of the reflective surface comprises to determine the surface slopes of substantially all of the reflective surface.

13. A method of determining geometric characteristics of reflective surfaces, the method comprising:

capturing an image of a reflective surface of a specimen with a camera, wherein a plurality of feature points of a target structure are reflected in the reflective surface such that the plurality of features points are present in the captured image; and determining one or more surface slopes of the reflective surface based on displacements of the plurality of feature points in the captured image relative to a reference image including the plurality of feature points.

14. The method of claim 13, wherein determining the one or more surface slopes of the reflective surface comprises applying a digital image correlation algorithm to the captured image and the reference image.

15. The method of claim 13, further comprising determining at least one of a curvature or a surface topology of the reflective surface based on the one or more surface slopes.

16. The method of claim 13, further comprising determining displacements of the plurality of features points in each of two perpendicular directions within a plane coincident with the target structure.

17. A method for determining geometric characteristics of reflective surfaces, the method comprising:

sensing electromagnetic waves with a sensor, wherein the electromagnetic waves have been reflected off a reflective surface of a specimen from a target structure including a feature point;

determining a displacement of the feature point of the target structure indicated by the sensed electromagnetic waves relative to reference data indicating a reference location for the feature point; and determining a surface slope of a point of the reflective surface based on the determined displacement of the feature point of the target structure.

18. The method of claim 17, further comprising determining at least one of a curvature or a surface topology of the reflective surface based on the surface slope.

19. The method of claim 17, wherein determining the surface slope of the point of the reflective surface comprises determining the surface slope based on a distance traveled by electromagnetic waves directed from the target structure to the specimen.

20. The system of claim 1, wherein the surface of the target structure has a speckle pattern comprising the plurality of light regions, the plurality of dark regions, and a plurality of intermediate intensity regions, wherein each feature point of the plurality of feature points comprises a point in an intermediate intensity region of the plurality of intermediate intensity regions.

* * * * *